March 24, 1936.   J. G. DOUGHERTY   2,034,800
AUTOMATIC ELECTRIC RADIATOR
Filed Sept. 5, 1931
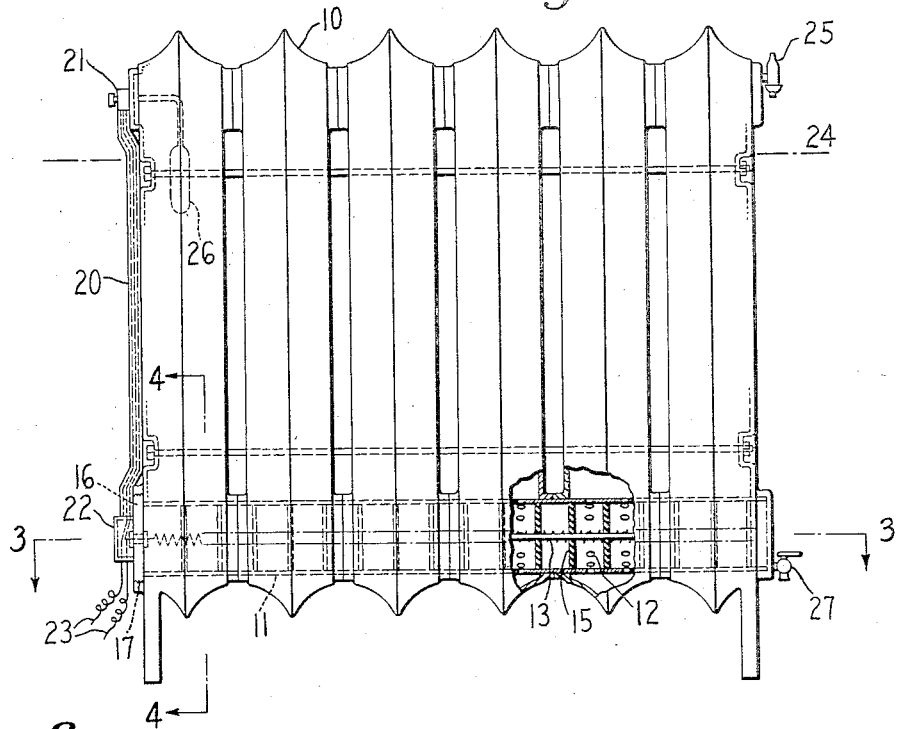
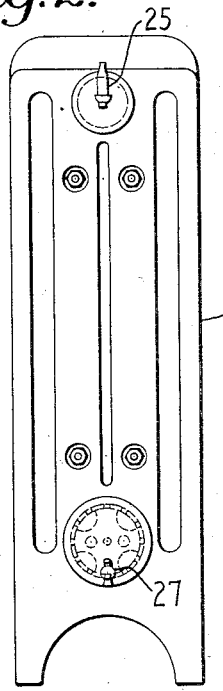
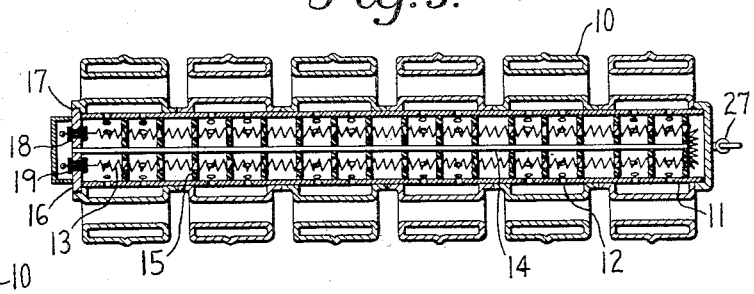
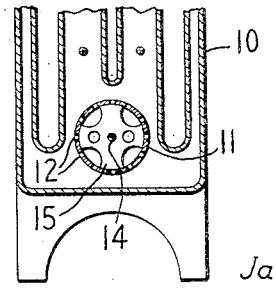
INVENTOR
James G. Dougherty
BY H. P. Van Deventer
ATTORNEY Patented Mar. 24, 1936

2,034,800

UNITED STATES PATENT OFFICE 2,034,800

AUTOMATIC ELECTRIC RADIATOR

James G. Dougherty, New York, N. Y., assignor to National Electromatic Corporation, a corporation of Delaware Application September 5, 1931, Serial No. 561,371

7 Claims. (Cl. 219—38)

This invention relates to automatic electric radiators.

It is well known that high temperatures are destructive to electric heating elements as commonly employed in electric heaters and particularly so if the elements are exposed to the atmosphere as in what is commonly known as radiant heaters. Another objection is that the heat is concentrated in radiant heaters and can only be reflected over a small area.

An object of the invention is to provide an electric heater comprising a radiator in which the electric heating element is protected from deterioration by being immersed in a body of special oil which not only prolongs the life of the element but absorbs the heat from the element and distributes it over the large radiating surface of the radiator.

Another object of the invention is to provide a radiator in which the consumption of electrical energy is automatically controlled by the heat absorbed and radiated by the body of oil.

To illustrate the invention a conventional type of metal radiator is shown and described, such as used with hot water or steam heating systems but the invention is not limited to any particular form or structure as many modifications can be readily made by those skilled in the art without departing from the invention as herein described and claimed.

In the drawing:

Figure 1 is a side view of a radiator, partly in section, to show the interior construction;

Figure 2 is an external end view of Figure 1;

Figure 3 is a view on the line 3—3 of Figure 1, and

Figure 4 is a view on the line 4—4 of Figure 1.

In the embodiment of the invention here illustrated, a radiator 10 of conventional type such as used in hot water or steam heating systems is shown. This can be made of as many sections as necessary to furnish the required radiating surface.

In the lower part of the assembled radiator is a member which may be a tube 11 in which there are openings 12 which allow free communication between the inside of this tube and the inside of each of the sections of radiator 10.

Inside of tube 11, is placed an electrical heating element 13, which may be of any suitable construction such as wire wound in helical form and supported by rod 14 and spacers 15 made of porcelain, lava or some suitable insulating material.

The entire heating element structure is securely mounted on plate 16 which is threaded on its outer edge and securely screwed into radiator 10 as shown at 17, or this structure may be secured in any other manner in fluid tight relation to the radiator 10, so as to form a unit readily removable from the radiator without disassembly.

In plate 16 are insulating bushings 18 and 19 through which are brought out connections from the heating element 13, one of these connections being carried through the conduit 20 to the thermostatic switch 21 situated in the upper part of radiator 10. A return wire from thermostat 21 passes down through conduit 20 to the junction box 22, where the wires 23 connect the heater to a source of electrical energy.

In operation, the radiator 10 is filled with a suitable fluid insulating medium. This may be oil and it is filled to the level shown by dotted line 24. Electrical energy is supplied to wires 23 which causes the element 13 to become heated, thus heating the oil which is in direct contact with the element. As the oil heats, it circulates through openings 12 and this distributes the heat throughout the entire body of oil, from which heat flows to the radiator.

As the oil heats, it expands, and rising above line 24, it forces the air out of the upper part of the radiator through escape valve 25, which opens outwardly only.

When the oil reaches a predetermined temperature, the thermostatic element 26 causes switch 21 to break the electrical circuit and the oil begins to cool. As the oil cools, it contracts and the valve 25 being designed so that air cannot enter, the oil when cool will be under subatmospheric pressure, under which condition it can be reheated with much less expenditure of electrical energy than if under normal atmospheric pressure. When the oil reaches a predetermined low temperature the thermostatic element closes switch 21 and the operation above described is repeated.

Drain valve 27 is provided to drain the oil from the radiator should occasion require.

The use of oil, an insulating medium, insures that the metallic radiator casing is not in electrical connection with the current supply, which would be the case if ordinary water or other conductive fluids were used.

Having shown and described the invention in a convenient structure and set forth its operation, what is claimed is:

1. A heating device comprising a sectional radiator, a hollow member communicating with each of the sections thereof, a perforated tube of cylindrical form supported in said member, a heating element insulatedly supported in said tube, a closure for said member secured to one end of said tube, terminals insulatedly supported on said closure and connected to said element, said closure tube and element being associated so they may be withdrawn from said member as a unit, a body of oil substantially filling said radiator and circulating between said element and the inner surface of the radiator, and a thermostat associated with said device adapted to control the flow of electrical current through said element.

2. A heating device comprising a sectional radiator, a hollow member below and communicating with each of the sections thereof, a closure plate for one end of said hollow member having a socket formed therein, a removable closure plate for the other end of said member, a perforated cylinder secured to said removable closure and supported in the socket formed in the fixed closure plate, a heating element insulatedly supported in said cylinder and having terminals in said removable closure, a valve in said radiator adapted to allow air to pass out of the radiator only, a body of oil in said radiator adapted to circulate through perforations in said cylinder and to conduct heat from the heating element to all sections of the radiator, and a thermostat adapted to control the flow of electric current through said element.

3. A heating device comprising a sectional radiator, a hollow member below and communicating with each of the sections thereof, a fixed closure plate for one end of said hollow member having a socket formed therein, a removable closure plate for the other end of said member, a perforated cylinder supported within the hollow member by said removable closure and the socket formed in the fixed closure plate, a heating element insulatedly supported in said cylinder and having terminals in said removable closure, a body of oil substantially filling said radiator, some of said oil being in contact with the heating element in said cylinder and communicating with the body of fluid via said perforations, a valve in said radiator adapted to allow air to pass out of the radiator only, and a thermostat adapted to control the flow of electric current through said element.

4. A heating device comprising a sectional radiator, a hollow member below and communicating with each of the sections thereof, a closure plate for one end of said hollow member having a socket formed therein, a removable closure plate for the other end of said member, a perforated cylinder secured to said removable closure and supported in the socket formed in the fixed closure plate, a heating element comprised of resistance wire insulatedly supported in said cylinder and having terminals in said removable closure, a body of oil in said radiator circulating to and from said heating element via said perforations, and a thermostat adapted to control the flow of electric current through said element.

5. A heating device comprising a sectional radiator, a hollow member below and communicating with each of the sections thereof, a closure plate for one end of said hollow member having a socket formed therein, a removable closure plate for the other end of said member, a perforated cylinder secured to said removable closure and supported in the socket formed in the fixed closure plate, a heating element comprised of electrical resistance insulatedly supported in said cylinder and having terminals in said removable closure, a body of oil in said radiator in contact with said resistance and circulating to and from the same via said perforations, thereby transferring heat from said resistances to surfaces of the radiator, a valve in said radiator adapted to allow air to pass out of the radiator only, and a thermostat in contact with said oil and adapted to control the flow of energy to said element.

6. In a radiator of the character described including a body of oil, a removable unitary structure comprising a closure plate for said radiator, a perforated cylinder secured to said plate, a heating element comprised of electrical resistance wire accessible via perforations in the cylinder, a plurality of insulating members in said cylinder spaced apart from each other and forming supports for said element, a central tie rod passing through said members making said element a unitary structure separable from said cylinder, insulating bushings in said plate, and terminals for said element passing through said bushings.

7. In a radiator of the character described, including a body of oil, a removable unitary structure comprising a closure plate for said radiator, a perforated circulative cylinder having one end thereof secured to said plate, a heating element comprised of grids of electrical resistance materials, a plurality of insulating members in said cylinder mounted on a central rod and spaced apart from each other and forming supports for said element, said grids, insulating members and said rod forming a unitary structure bodily removable from said cylinder, insulating bushings in said plate, and terminals for said element positioned adjacent to one end of the cylinder and passing through said bushings.

JAMES G. DOUGHERTY.